United States Patent
Yang et al.

(10) Patent No.: US 9,875,705 B2
(45) Date of Patent: Jan. 23, 2018

(54) DISPLAY APPARATUS AND METHOD OF DRIVING THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jiuxia Yang, Beijing (CN); Feng Bai, Beijing (CN); Jiantao Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/327,378

(22) PCT Filed: Jan. 14, 2016

(86) PCT No.: PCT/CN2016/070882
§ 371 (c)(1),
(2) Date: Jan. 18, 2017

(87) PCT Pub. No.: WO2016/180048
PCT Pub. Date: Nov. 17, 2016

(65) Prior Publication Data
US 2017/0154589 A1    Jun. 1, 2017

(30) Foreign Application Priority Data

May 13, 2015 (CN) .......................... 2015 1 0243833
Jul. 22, 2015 (CN) .......................... 2015 1 0435028

(51) Int. Cl.
G02B 26/00    (2006.01)
G02B 26/02    (2006.01)
(Continued)

(52) U.S. Cl.
CPC ......... *G09G 3/3648* (2013.01); *G09G 3/3426* (2013.01); *G02B 26/02* (2013.01);
(Continued)

(58) Field of Classification Search
CPC .... G02B 26/02; G02B 26/04; G02B 26/0825; G02B 26/0841; G02F 1/133345;
(Continued)

(56) References Cited

U.S. PATENT DOCUMENTS 6,160,527 A * 12/2000 Morishima ........ G02B 27/2214
345/32
6,169,538 B1 * 1/2001 Nowlan ................ G06F 3/0488
341/22

(Continued)

FOREIGN PATENT DOCUMENTS

CN    1638571 A    7/2005
CN    101000921 A    7/2007
(Continued)

OTHER PUBLICATIONS

International Search Report and Written Opinion dated Apr. 8, 2016, for corresponding PCT Application No. PCT/CN2016/070882.
(Continued)

*Primary Examiner* — Michael J Eurice
(74) *Attorney, Agent, or Firm* — Kinney & Lange, P.A.

(57) ABSTRACT

Embodiments of the present invention provide a display apparatus and a method of driving the display apparatus. The display apparatus includes a display panel, a visual state acquiring module, and a visual acuity correcting module. The display panel includes M×N sub-pixels arranged in a
(Continued)

matrix for displaying an image signal. The visual acuity correcting module is disposed in a display area of the display panel and includes a plurality of light blocking structures, the plurality of light blocking structures form M×N grid holes in one-to-one correspondence with the sub-pixels, and the visual acuity correcting module is configured to adjust sizes of the grid holes.

11 Claims, 6 Drawing Sheets

(51) Int. Cl.
| | |
|---|---|
| G09G 5/10 | (2006.01) |
| G09G 3/36 | (2006.01) |
| G09G 3/34 | (2006.01) |
| G02F 1/1335 | (2006.01) |
| G02F 1/1368 | (2006.01) |
| G02F 1/1333 | (2006.01) |
| G02B 26/08 | (2006.01) |
| G02B 26/04 | (2006.01) |

(52) U.S. Cl.
CPC .......... *G02B 26/04* (2013.01); *G02B 26/0825* (2013.01); *G02B 26/0841* (2013.01); *G02F 1/1368* (2013.01); *G02F 1/133345* (2013.01); *G02F 1/133512* (2013.01); *G02F 1/133514* (2013.01); *G02F 1/133528* (2013.01); *G02F 2201/121* (2013.01); *G02F 2201/123* (2013.01); *G09G 3/3433* (2013.01); *G09G 2300/04* (2013.01); *G09G 2310/0235* (2013.01); *G09G 2330/021* (2013.01); *G09G 2360/144* (2013.01)

(58) Field of Classification Search
CPC ......... G02F 1/133512; G02F 1/133514; G02F 1/133528; G02F 1/1368; G02F 2201/121; G02F 2201/123; G09G 3/3426; G09G 3/3433; G09G 3/3648; G09G 2300/04; G09G 2310/0235; G09G 2330/021; G09G 2360/144
See application file for complete search history.

(56) References Cited

U.S. PATENT DOCUMENTS

| | | | |
|---|---|---|---|
| 7,744,216 B1 | 6/2010 | Uhlhorn | |
| 2003/0117418 A1* | 6/2003 | Poynter | G09G 3/3611 345/619 |
| 2004/0046743 A1* | 3/2004 | Ekstrom | G06F 3/021 345/168 |
| 2004/0130884 A1* | 7/2004 | Yoo | G02B 6/0028 362/613 |
| 2008/0018243 A1* | 1/2008 | Ishiguro | H01J 29/30 313/506 |
| 2008/0259098 A1* | 10/2008 | Zamorsky | A61H 5/00 345/690 |
| 2009/0237381 A1* | 9/2009 | Otani | G02F 1/1362 345/207 |
| 2009/0254855 A1* | 10/2009 | Kretz | G06F 1/1626 715/800 |
| 2009/0281604 A1* | 11/2009 | De Boer | A61M 21/00 607/88 |
| 2010/0090942 A1* | 4/2010 | Sumi | G09G 3/2022 345/102 |
| 2010/0110311 A1* | 5/2010 | Sade | G02B 27/0101 348/750 |
| 2011/0221693 A1* | 9/2011 | Miyazaki | G06F 3/0236 345/173 |
| 2012/0287494 A1* | 11/2012 | Takahashi | G09G 3/3433 359/230 |
| 2012/0293564 A1* | 11/2012 | Kajiyama | G09G 3/2022 345/690 |
| 2012/0307335 A1* | 12/2012 | Kuriyagawa | G02B 26/023 359/230 |
| 2012/0326179 A1* | 12/2012 | Kaitoh | G02B 26/0841 257/88 |
| 2012/0327351 A1* | 12/2012 | Fraval | G02B 27/22 349/139 |
| 2013/0038641 A1* | 2/2013 | Muneyoshi | G02B 26/023 345/690 |
| 2013/0076805 A1* | 3/2013 | Kajiyama | G09G 5/10 345/690 |
| 2013/0093796 A1* | 4/2013 | Lee | G09G 3/003 345/690 |
| 2013/0155481 A1* | 6/2013 | Nitta | G02B 26/02 359/230 |
| 2013/0335656 A1* | 12/2013 | Liu | G02F 1/13306 349/41 |
| 2014/0111558 A1* | 4/2014 | Ishitani | G09G 5/10 345/690 |
| 2014/0111750 A1* | 4/2014 | Li | G02F 1/1333 349/110 |
| 2014/0160175 A1* | 6/2014 | Uemura | G09G 3/20 345/690 |
| 2014/0285643 A1* | 9/2014 | Usukura | G02B 27/2214 348/59 |
| 2015/0269892 A1* | 9/2015 | Yang | G09G 3/3406 345/690 |
| 2015/0356930 A1* | 12/2015 | Kuranaga | G09G 3/3453 345/85 |
| 2015/0359067 A1* | 12/2015 | Kurita | H05B 37/0218 315/151 |
| 2016/0018635 A1* | 1/2016 | Adachi | G02B 26/0841 359/228 |
| 2016/0116979 A1* | 4/2016 | Border | G06F 3/013 345/156 |
| 2016/0131912 A1* | 5/2016 | Border | G02B 27/0176 345/8 |
| 2016/0147067 A1* | 5/2016 | Hua | G02B 27/017 345/419 |
| 2016/0204716 A1* | 7/2016 | Suzuki | B81B 3/0054 359/230 |
| 2016/0293121 A1* | 10/2016 | Zeng | G09G 3/3611 |
| 2016/0372528 A1* | 12/2016 | Kamura | H01L 51/0096 |

FOREIGN PATENT DOCUMENTS

| | | |
|---|---|---|
| CN | 101133438 A | 2/2008 |
| CN | 101540157 A | 9/2009 |
| CN | 102028577 A | 4/2011 |
| CN | 102681241 A | 9/2012 |
| CN | 103019917 A | 4/2013 |
| CN | 104795046 A | 7/2015 |
| CN | 14966481 A | 10/2015 |
| EP | 0827350 A2 | 3/1998 |
| JP | H11297114 A | 10/1999 |
| JP | 2003076353 A | 3/2003 |
| JP | 2004180208 A | 6/2004 |

OTHER PUBLICATIONS

English Translation of "Vision Correction Display", dated May 18, 2017, 3 pages.

* cited by examiner

DISPLAY APPARATUS AND METHOD OF DRIVING THE SAME

CROSS-REFERENCE TO RELATED APPLICATIONS

This application is a Section 371 National Stage Application of International Application No. PCT/CN2016/070882, filed on 14 Jan. 2016, entitled "DISPLAY APPARATUS AND METHOD OF DRIVING THE SAME", which claims priority to Chinese Application No. 201510243833.5, filed on 13 May 2015 and Chinese Application No. 201510435028.2, filed on 22 Jul. 2015, incorporated herein by reference in their entirety.

BACKGROUND

1. Technical Field

Embodiments of the present invention relate to the field of display, and particularly to a display apparatus and a method of driving the display apparatus.

2. Description of the Related Art

With progress of display technology, electronic apparatuses are gradually applied to various fields, while a display as one important component of an electronic apparatus has been gradually widely applied to various electronic apparatuses such as a mobile telephone, a personal digital assistant (PDA), a digital camera, a computer screen or a notebook computer screen.

The display itself, of an electronic product, has an influence on a visual acuity of a user. The display will do more harm to the visual acuity of the user if the user uses the display for a long time. However, the current display does not have a visual acuity protecting function. Long-time use of the electronic product will cause the user a visual fatigue and affect the visual acuity of the user, and result in a steep decrease of the visual acuity of the user and even injure eyes of the user in serious cases. Thus, it is a problem to be solved urgently by technical personnel in the industry to design a display apparatus that can protect the visual acuity of the user.

SUMMARY

Embodiments of the present invention provide a display substrate assembly. The display substrate assembly comprises: a plurality of light-transmissible first regions arranged in an array, wherein each of the first regions serves as a sub-pixel, at least two adjacent ones of the sub-pixels constitute a pixel, and the sub-pixels in each of the pixels correspond to backlights of different colors, respectively. The display substrate assembly further comprises a plurality of light blocking structures in one-to-one correspondence with the sub-pixels, wherein each of the light blocking structures is configured to adjust a light transmittance of one of the sub-pixels.

In accordance with embodiments of the present invention, each of the light blocking structures comprises at least two light blocking plates having different light transmittances, and different ones of the light blocking plates are selected to adjust the light transmittance of the sub-pixel.

In accordance with embodiments of the present invention, each of the light blocking structures comprises at least one light blocking plate being completely light-intransmissible or lighttight, and the light blocking plate is moved to adjust the light transmittance of the sub-pixel.

In accordance with embodiments of the present invention, the display substrate assembly is provided with a linear drive motor for driving the light blocking plate, and the linear drive motor drives the light blocking plate to move according to a control signal applied to the linear drive motor.

In accordance with embodiments of the present invention, the control signal comprises a current, of which a direction determines a moving direction of the light blocking plate.

In accordance with embodiments of the present invention, the control signal comprises a voltage, of which a value determines a moving distance of the light blocking plate.

In accordance with embodiments of the present invention, the light blocking structure comprises N light blocking plates, where N is a positive integer greater than or equal to 2; and the light blocking plates are moved in sequence, and, when an n-th light blocking plate is moved to a limit position, an n+1-th light blocking plate begins to be moved, where n is a positive integer greater than or equal to 1 but less than or equal to N−1.

In accordance with embodiments of the present invention, the display substrate assembly further comprises a position sensor in cooperation with the light blocking plates, and the position sensor is configured to determine a position where each of the light blocking plates is located.

In accordance with embodiments of the present invention, the display substrate assembly further comprises a chamber located between two adjacent ones of the sub-pixels, for placing the light blocking plate.

In accordance with embodiments of the present invention, the light blocking structure comprises at least two light blocking plates placed in the chamber in a superposed state.

In accordance with embodiments of the present invention, a lubricating structure is disposed between any two adjacent ones of the light blocking plates placed in the chamber in the superposed state, for reducing a friction between the two adjacent ones of the light blocking plates.

In accordance with embodiments of the present invention, the lubricating structure is a gas lubricating layer or a liquid lubricating layer.

In accordance with embodiments of the present invention, the lubricating structure is a gas lubricating layer, and a gas in the gas lubricating layer is $N_2$.

In accordance with embodiments of the present invention, materials for the light blocking plate and the chamber are silicon material.

Embodiments of the present invention further provide a display apparatus comprising the abovementioned display substrate assembly.

In accordance with embodiments of the present invention, the display apparatus further comprises a control unit and a drive unit in cooperation with the light blocking structures, the control unit is configured to output a control signal, and the drive unit is configured to control the light blocking structures to move according to the control signal.

In accordance with embodiments of the present invention, the drive unit comprises gate lines and data lines crossing over each other, second regions surrounded by the gate lines and the data lines are in one-to-one correspondence with the first regions serving as the sub-pixels, a thin film transistor is disposed within each of the second regions, the thin film transistor has a source electrically connected to the data line, a gate electrically connected to the gate line, and a drain electrically connected to a drive electrode disposed on the light blocking plate, and the drive electrode is electrically connected to the linear drive motor for applying a voltage and a current to the linear drive motor; and the control unit comprises a source driver circuit and a gate driver circuit, the source driver circuit is electrically connected to the date line to input a signal to the data line, and the gate driver circuit is electrically connected to the gate line to input a signal to the gate line.

In accordance with embodiments of the present invention, the display apparatus further comprises a plurality of backlights in one-to-one correspondence with the sub-pixels, and the control unit further comprises a backlight control circuit for controlling turn-ons and turn-offs of the backlights.

In addition, embodiments of the present invention also provide a method of driving the abovementioned display substrate assembly. The method comprises controlling each of the light blocking structures to be moved, thereby adjusting the light transmittance of each of the sub-pixels.

In accordance with embodiments of the present invention, the step of controlling each of the light blocking structures comprises applying a voltage and a current to the linear drive motor for driving each of the light blocking plates, thereby controlling a moving distance and a moving direction of the light blocking plate.

Embodiments of the present invention provide a display apparatus comprising a display panel and a visual acuity correcting module, wherein:

the display panel comprises M×N sub-pixels arranged in a matrix for displaying an image signal; and the visual acuity correcting module is disposed in a display area of the display panel and comprises a plurality of light blocking structures, the plurality of light blocking structures form M×N grid holes in one-to-one correspondence with the sub-pixels, and the visual acuity correcting module is configured to adjust sizes of the grid holes.

In accordance with embodiments of the present invention, the apparatus further comprises a visual information acquiring module and a visual state analyzing module;

the visual information acquiring module is configured to acquire a frequency of wink of a user, and the visual state analyzing module is configured to analyze and acquire a visual fatigue state of the user according to the frequency of wink of the user; and the visual acuity correcting module is further configured to adjust the sizes of the grid holes according to the visual fatigue state of the user.

In accordance with embodiments of the present invention, the apparatus further comprises a display controlling module, the visual information acquiring module is further configured to acquire a distance from the user to the display apparatus, and the visual state analyzing module is further configured to analyze and acquire a visual dioptric state of the user according to the distance from the user to the display apparatus; and the display controlling module is configured to adjust a scaling of an image displayed on the display panel according to the visual dioptric state of the user.

In accordance with embodiments of the present invention, the display apparatus further comprises an ambient monitoring module, the ambient monitoring module is configured to detect an ambient light intensity; and the display controlling module is further configured to adjust a display luminance of the display panel according to the ambient light intensity.

In accordance with embodiments of the present invention, the display apparatus further comprises a storage module, and the storage module is configured to store the visual fatigue state and the visual dioptric state of the user.

Embodiments of the present invention provide a method of driving a display apparatus, the display apparatus comprises a display panel and a visual acuity correcting module, wherein: the display panel comprises M×N sub-pixels arranged in a matrix for displaying an image signal, and the visual acuity correcting module is disposed in a display area of the display panel and comprises a plurality of light blocking structures, the plurality of light blocking structures form M×N grid holes in one-to-one correspondence with the sub-pixels, and the visual acuity correcting module is configured to adjust sizes of the grid holes; the method comprises:

driving the display panel to display an image signal; and adjusting the sizes of the grid holes.

In accordance with embodiments of the present invention, the method further comprises:

acquiring a frequency of wink of a user; and analyzing and acquiring a visual fatigue state of the user according to the frequency of wink of the user; and the adjusting the sizes of the grid holes comprises:

adjusting the sizes of the grid holes according to the visual fatigue state of the user.

In accordance with embodiments of the present invention, the method further comprises:

acquiring a distance from the user to the display apparatus;

analyzing and acquiring a visual dioptric state of the user according to the distance from the user to the display apparatus; and adjusting a scaling of an image displayed on the display panel according to the visual dioptric state of the user.

In accordance with embodiments of the present invention, the method further comprises:

acquiring an ambient light intensity; and adjusting a display luminance of the display panel according to the ambient light intensity.

In accordance with embodiments of the present invention, the method further comprises: storing the visual fatigue state and the visual dioptric state of the user.

DETAILED DESCRIPTION OF THE EMBODIMENTS

A further description of the invention will be made in detail as below with reference to embodiments of the present invention taken in conjunction with the accompanying drawings. The following embodiments are intended to explain the present invention and the present invention should not be construed as being limited to the embodiments set forth herein.

Embodiment 1

Figure 1:
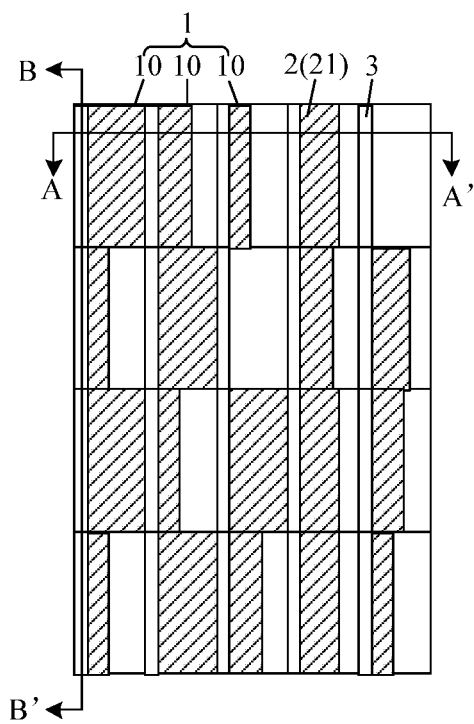
FIG. 1 is a schematic plan view of a display substrate assembly according to an embodiment of the present invention.
Figure 2:
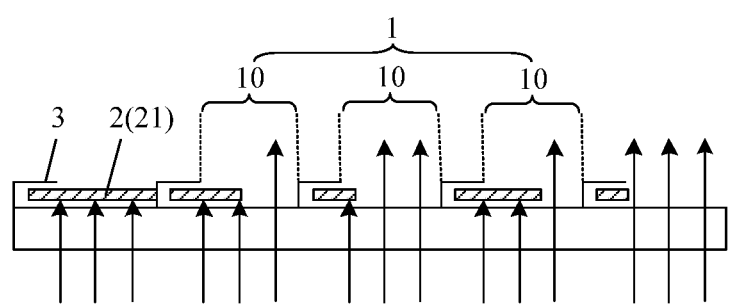
FIG. 2 is a sectional view taken along the line A-A' in FIG. 1 according to the embodiment of the present invention.
Figure 3:
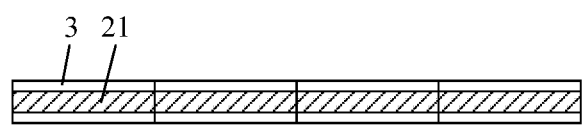
FIG. 3 is a sectional view taken along the line B-B' in FIG. 1 according to the embodiment of the present invention.

Embodiments of the present invention provide a display substrate assembly. Specifically, as shown in FIG. 1, FIG. 2 and FIG. 3, the display substrate assembly comprises a plurality of light-transmissible first regions arranged in an array. Each of the first regions serves as a sub-pixel 10, at least two adjacent ones of the sub-pixels 10 constitute a pixel 1, and the sub-pixels 10 in each of the pixels 1 correspond to backlights of different colors, respectively. The display substrate assembly further comprises a plurality of light blocking structures 2 in one-to-one correspondence with the sub-pixels 10. Each of the light blocking structures 2 is configured to adjust a light transmittance of one of the sub-pixels 10.

In some embodiments, three adjacent sub-pixels 10 constitute one pixel 1, and the sub-pixels 10 in each of the pixels 1 correspond to red, green and blue backlights, respectively.

It is to be noted that a display substrate assembly necessarily comprises a substrate. A substrate according to embodiments of the present invention may be a transparent substrate or an opaque substrate. When the substrate is the transparent substrate, the sub-pixels 10 are through holes or blind holes formed in the transparent substrate, or transparent regions, arranged in an array, of the transparent substrate are chosen to directly serve as the sub-pixel 10 without implementing a hole digging process on the transparent substrate. When the substrate is the opaque substrate, the sub-pixels 10 are through holes formed in the opaque substrate.

The light blocking structure 2 can be embodied in many types. In order to facilitate those skilled in the art to understand and achieve the embodiments, two types of specific light blocking structures 2 are provided in the embodiments of the present invention.

Figure 4:
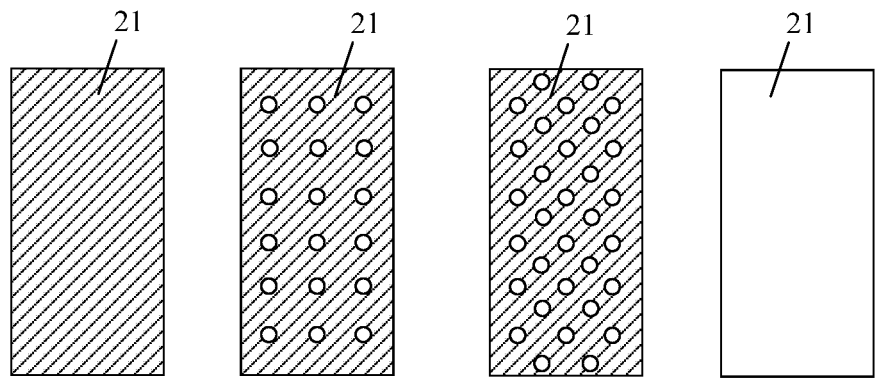
FIG. 4 is a schematic plan view of four light blocking plates comprised by a first light blocking structure according to an embodiment of the present invention.

In some embodiments, a first type of light blocking structures are shown in FIG. 4. Each of the light blocking structures 2 comprises at least two light blocking plates 21 having different light transmittances, and different ones of the light blocking plates 21 are selected to adjust the light transmittance of the sub-pixel 10. The adjustment of the light transmittance of the sub-pixel 10 by the light blocking structure 2 as shown in FIG. 4 is restricted by the number of the light blocking plates 21. The more the number of the light blocking plates 21 is, the more flexible the adjustment of the light transmittance of the sub-pixel 10 by the light blocking structure 2 is, but accordingly the more complicated the light blocking structure 2 is.

In some embodiments, a second type of light blocking structures are shown in FIG. 2. Each of the light blocking structures 2 comprises at least one light blocking plate 21 being completely light-intransmissible or lighttight, and the light blocking plate 21 is moved to adjust the light transmittance of the sub-pixel 10. Since the light blocking structure 2 as shown in FIG. 2 can achieve a flexible adjustment of the light transmittance of the sub-pixel 10 under a condition where the light blocking structure 2 has a simple structure, it may be selected in the embodiments of the present invention. In other words, the light blocking plate 21 included by each of the light blocking structures 2 is completely light-intransmissible or lighttight.

It is to be noted that, the light blocking plate 21 may be located either over or under the sub-pixel 10, so long as it can adjust the light transmittance of the sub-pixel 10.

A structure and the number of the light blocking plate 21 included by the light blocking structure 2 as shown in FIG. 2 will be described in the embodiments of the present invention.

Figure 5:
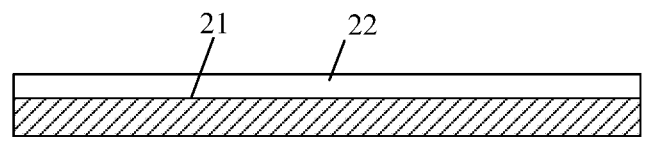
FIG. 5 is a schematic sectional view of a light blocking plate comprised by a second light blocking structure according to an embodiment of the present invention.

In some embodiments, as shown in FIG. 5, a drive electrode 22 is disposed on the light blocking plate 21 and is electrically connected to a linear drive motor disposed in the display substrate assembly. The linear drive motor drives the light blocking plate 21 to move according to a control signal applied to the linear drive motor. In some embodiments, the control signal comprises a current of which a direction determines a moving direction of the light blocking plate 21. The control signal comprises a voltage of which a value determines a moving distance of the light blocking plate 21. Therefore, the moving direction or the moving distance of the light blocking plate 21 can be accurately adjusted by adjusting the direction of the current or the value of the voltage applied to the linear drive motor, thereby simplifying a method of driving the light blocking plate 21 and a method of driving the display substrate assembly.

It is to be noted that main reasons why the linear drive motor can drive the light blocking plate 21 to move is that a corresponding routine is set in a control unit for outputting a control signal to the linear drive motor. In the routine, a relation between the direction of the current applied to the linear drive motor and the moving direction of the light blocking plate 21 has been defined. Since the direction of the current includes only two positive and negative directions, it will be sufficient that the moving directions of the light blocking plate 21 are in one-to-one correspondence with the positive and negative directions of the current. In the routine, a functional relation curve between the voltage applied to the linear drive motor and the moving distance of the light blocking plate 21 has also been set. A functional relation between them is only a simple linear relation. When the voltage is increased, the moving distance of the light blocking plate 21 is increased accordingly. When the voltage is decreased, the moving distance of the light blocking plate 21 is decreased accordingly.

In some embodiments, the light blocking structure 2 comprises N light blocking plates 21, where N is a positive integer greater than or equal to 2. When the light transmittance of the sub-pixel 10 is adjusted, the light blocking plates 21 are moved in sequence, and when an n-th light blocking plate 21 is moved to a limit position, an n+1-th light blocking plate 21 begins to be moved, where n is a positive integer greater than or equal to 1 and less than or equal to N−1. Thereby, the adjustment of the light transmittance of the sub-pixel 10 by the light blocking structure 2 is more flexible and more accurate.

In addition, the display substrate assembly according to the embodiments of the present invention further comprises a position sensor in cooperation with the light blocking plates 21, and the position sensor is configured to determine a position where each of the light blocking plates 21 is located, thereby to facilitate determining the moving direction in which the light blocking plate 21 needs to be moved and the moving distance by which the light blocking plate 21 needs to be moved when the light blocking plate 21 is to be moved to a next position. When the display substrate assembly comprises the linear drive motor for driving the light blocking plate 21, the position where each of the light blocking plates 21 is located is determined by the position sensor, thereby to facilitate determining the direction of the current and the value of the voltage which are needed to be applied to the linear driving motor when the light blocking plate 21 is to be moved to the next position.

Figure 6:
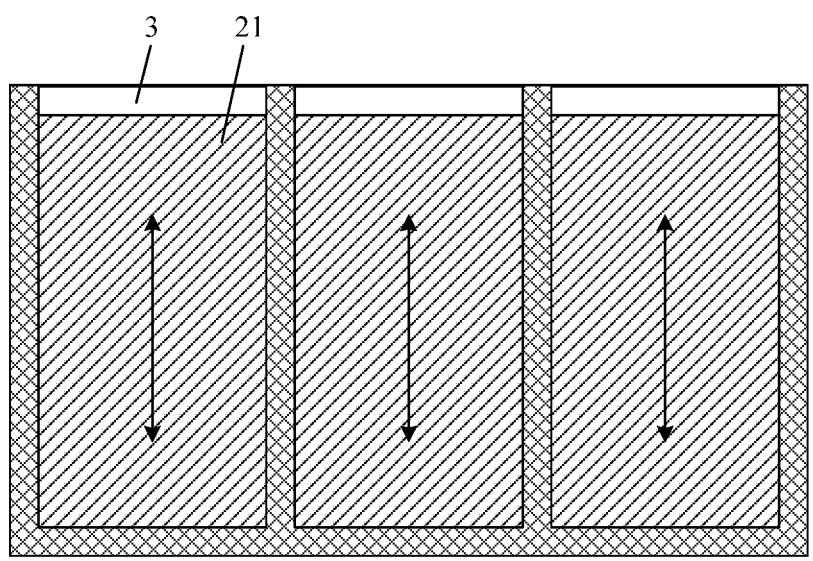
FIG. 6 is a schematic view showing a positional relationship between a sub-pixel and a chamber according to an embodiment of the present invention.
Figure 7:
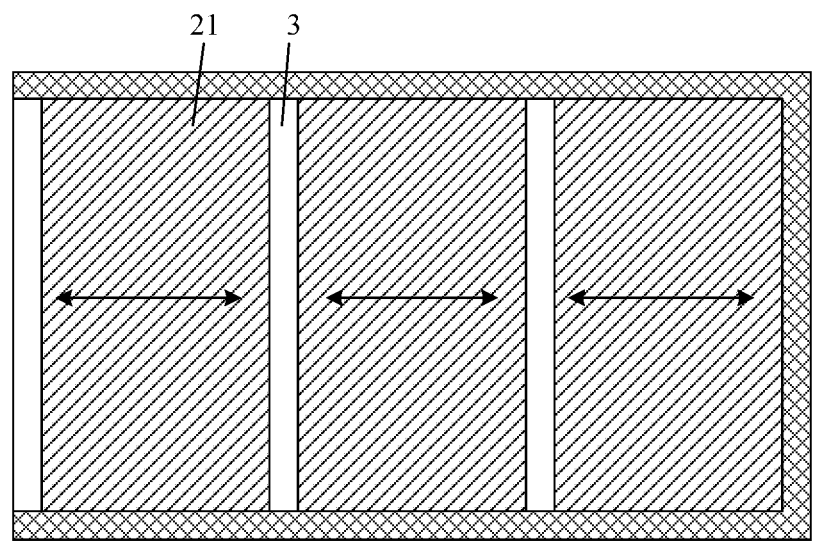
FIG. 7 is another schematic view showing the positional relationship between the sub-pixel and the chamber according to the embodiment of the present invention.

Optionally, as shown in FIG. 2, FIG. 3 and FIG. 6, the display substrate assembly further comprises a chamber 3 located between two adjacent ones of the sub-pixels 10, for placing the light blocking plate 21. In some embodiments, the chamber 3 is disposed on at least one of an upper side, a lower side, a left side or a right side of each of the sub-pixels 10. When a positional relationship between the sub-pixel 10 and the chamber 3 corresponding to the sub-pixel varies, the moving direction of the light blocking plate 21 placed in the chamber 3 varies. When the chamber 3 is disposed on the upper side or the lower side of each of the sub-pixels 10, the light blocking plate 21 is moved in an up-down direction. When the chamber 3 is disposed on the left side or the right side of each of the sub-pixels 10, the light blocking plate 21 is moved in a left-right direction. In the embodiments of the present invention, the positional relationships between all of the sub-pixels 10 and the chambers 3 corresponding to them are the same, so that the moving directions of all of the light blocking plates 21 are the same, thereby simplifying a method of driving the light blocking plates 21 and a method of driving the display substrate assembly. In some embodiments, as shown in FIG. 6, the chamber 3 is disposed on the upper side of each of the sub-pixels 10, and the light blocking plate 21 is moved in the up-down direction (i.e. a direction indicated by an arrow shown in FIG. 6). As shown in FIG. 7, the chamber 3 is disposed on the left side of each of the sub-pixels 10, and the light blocking plate 21 is moved in the left-right direction (i.e. a direction indicated by an arrow shown in FIG. 7).

In some embodiments, when the light blocking structure 2 comprises at least two light blocking plates 21, the light blocking plates 21 are placed in the chamber 3 in a superposed state, so that the chamber 3 has a smaller size in a plane parallel to the substrate to facilitate disposition of more sub-pixels 10 in the display substrate assembly, thereby improving an aperture ratio and a resolution of the display apparatus.

In some embodiments, a lubricating structure is disposed between any two adjacent ones of the light blocking plates 21 placed in the chamber 3 in the superposed state, for reducing a friction between the two adjacent ones of the light blocking plates 21. In some embodiments, the lubricating structure is a gas lubricating layer or a liquid lubricating layer. In the embodiments of the present invention, the lubricating structure is a gas lubricating layer, and a gas in the gas lubricating layer is $N_2$. Thereby, the disposition of the lubricating structure will not pollute the display substrate assembly and will not affect a display effect of the display substrate assembly.

In addition, the light blocking plates 21 and the chambers 3 in the embodiments of the present invention are formed by means of a microelectromechanical system (MEMS). Silicon has advantages that it is good in mechanical and electrical performances, and its strength, hardness, and Young modulus are equivalent to those of iron, its density is similar to that of aluminum, and its thermal conductivity is close to those of molybdenum and tungsten. Therefore, in the embodiments of the present invention, materials for the light blocking plates 21 and the chambers 3 are silicon material.

The embodiments of the present invention provide the abovementioned display substrate assembly. Since the sub-pixels in each of the pixels correspond to backlights of different colors, respectively, and the light transmittance of each of the sub-pixels can be adjusted with the light blocking structure, an amount of each of lights of different colors transmitted by each pixel can be adjusted, so as to enable each pixel to display different color. As a result, the display apparatus can achieve a color displaying without using a color filter substrate, so that a power consumption of the display apparatus can be reduced.

In addition, embodiments of the present invention also provide a display apparatus comprising the abovementioned display substrate assembly.

In some embodiments, the display apparatus further comprises a control unit and a drive unit in cooperation with the light blocking structure 2, the control unit is configured to output a control signal, and the drive unit is configured to control the light blocking structure 2 to move according to the control signal.

In some embodiments, when each of the light blocking structures 2 comprises at least one light blocking plate 21 being completely light-intransmissible or lighttight and the display substrate assembly is provided with a linear drive motor for driving the light blocking plate 21, the drive unit comprises gate lines and data lines crossing over each other, second regions surrounded by the gate lines and the data lines are in one-to-one correspondence with the first regions serving as the sub-pixels 10. A thin film transistor is disposed within each of the second regions, the thin film transistor has a source electrically connected to the data line, a gate electrically connected to the gate line, and a drain electrically connected to a drive electrode 22 disposed on the light blocking plate 21, and the drive electrode 22 is electrically connected to the linear drive motor for applying a voltage and a current to the linear drive motor. Thereby, the light blocking plate 21 is driven to move, thereby achieving the adjustment of the light transmittance of the sub-pixel 10. The control unit comprises a source driver circuit and a gate driver circuit, the source driver circuit is electrically connected to the date line to input a signal to the data line, and the gate driver circuit is electrically connected to the gate line to input a signal to the gate line.

Embodiments of the present invention provide the following two kinds of disposing manners of the gate lines, the data lines and the thin film transistors.

In the first disposing manner, the gate lines, the data lines and the thin film transistors are disposed in the display substrate assembly. Specifically, the gate lines, the data lines and the thin film transistors may be disposed in regions between two adjacent ones of the sub-pixels 10 in the display substrate assembly. In this case, the second regions surrounded by the gate lines and the data lines coincide with the first regions to serve as the sub-pixels 10.

In the second disposing manner, the gate lines, the data lines and the thin film transistors are disposed in another substrate assembly which is to be assembled with the display substrate assembly, and the drain of the thin film transistor is electrically connected to the drive electrode 22 disposed on the light blocking plate 21 through a conductive structure such as a conductive ball.

When the first disposing manner is adopted for the gate lines, the data lines and the thin film transistors, the display apparatus has a simpler structure, and the drain of the thin film transistor and the drive electrode 22 are located in the same substrate assembly and are electrically connected directly to each other, or are electrically connected to each other through a via hole filled with a conductive substance, so that the electrical connection between the drain of the thin film transistor and the drive electrode 22 is better. Therefore, in the embodiments of the present invention, the first disposing manner may be adopted for the gate lines, the data lines and the thin film transistors.

In addition, the display apparatus further comprises a black matrix for blocking the gate lines, the data lines and the thin film transistors so that the gate lines, the data lines and the thin film transistors cannot be seen by human eyes, thereby improving aesthetic property. In some embodiments, when the first disposing manner is adopted for the gate lines, the data lines and the thin film transistors, the black matrix covers the gate lines, the data lines and the thin film transistors. When the second disposing manner is adopted for the gate lines, the data lines and the thin film transistors, the black matrix is located at a position, corresponding to the gate lines, the data lines and the thin film transistors located in the display substrate assembly, in the other substrate assembly.

In some embodiments, the display apparatus further comprises a plurality of backlights in one-to-one correspondence with the sub-pixels 10, and the control unit further comprises a backlight control circuit for controlling turn-ons and turn-offs of the backlights.

In a displaying process of the display apparatus, the backlights of different colors may be turned on at the same time or at different times. A color mixture manner of the sub-pixels 10 in each pixel 1 is a spatial color mixture manner when the backlights of different colors are turned on at the same time, while the color mixture manner of the sub-pixels 10 in each pixel 1 is a temporal color mixture manner when the backlights of different colors are turned on at different times.

In the embodiments of the present invention, the backlights of different colors are turned on at different times and the color mixture manner of the sub-pixels 10 in each pixel 1 is the temporal color mixture manner, so that the display apparatus has a lower power consumption. In some embodiments, when the backlights of one color are turned on, the sub-pixels 10 in one-to-one correspondence with the backlights of the one color are all turned on (i.e. according to a required light transmittance of each sub-pixel 10, a position of the corresponding light blocking plate 21 can be adjusted), while the sub-pixels 10 in one-to-one correspondence with the backlights of the other colors are all turned off.

The display apparatus according to the embodiments of the present invention comprises the abovementioned display substrate assembly. Therefore, with the display apparatus, the display apparatus can achieve a color displaying without using a color filter substrate, so that a power consumption of the display apparatus can be reduced.

In addition, in a conventional display apparatus, an amount of light emitted from the display apparatus is determined by cooperation between a liquid crystal molecule layer and polarization filters. However, in the embodiments of the present invention, the light transmittance of each of the sub-pixels can be adjusted by using the light blocking structure. Therefore, the display apparatus in the embodiments of the present invention need not use the liquid crystal molecule layer and can thus reduce a cost of the display apparatus.

Embodiments of the present invention further provide a method of driving the abovementioned display substrate assembly. The method comprises controlling each of the light blocking structures 2 to be moved, thereby adjusting the light transmittance of each of the sub-pixels 10. How to adjust the light transmittance of each of the sub-pixels 10 has been described with respect to a structure of the display substrate assembly correspondingly hereinabove, and thus will be no longer described herein for the sake of brevity.

In some embodiments, as can be known from the above description, the light blocking structure 2 may have various possible configurations. A method of driving the display apparatus varies depending on the configuration of the light blocking structure 2. In some embodiments, when each of the light blocking structures 2 comprises at least one light blocking plate 21 being completely light-intransmissible or lighttight and the display substrate assembly is provided with a linear drive motor for driving the light blocking plate 21, the step of controlling each of the light blocking structures 2 comprises applying a voltage and a current to the linear drive motor, thereby controlling a moving distance and a moving direction of the light blocking plate 21.

The embodiments of the present invention provide a method of driving the display substrate assembly. The method comprises controlling each of the light blocking structures to adjust the light transmittance of each of the sub-pixels. Thus, an amount of each of lights of different colors transmitted by each pixel can be adjusted, so as to enable each pixel to display different color. As a result, the display apparatus can achieve a color displaying without using a color filter substrate, so that a power consumption of the display apparatus can be reduced.

Embodiment 2

It is to be noted that the terms "row" and "column" in the embodiments of the present invention are relative terms. In the embodiments of the present invention, the term "row" is described by taking a row in a horizontal direction, i.e. a transverse direction of the present application as an example, and the term "column" is described by taking a column in a vertical direction, i.e. a longitudinal direction of the present application as an example. However, the pixels are arranged in a matrix form, thus, when the pixels are viewed from different directions, the row and the column may be exchanged and the transverse direction and the longitudinal direction may also be exchanged.

Furthermore, in this embodiment, the display panel 11 may be any appropriate display panel such as a conventional display panel, and is not limited to the display panel described in the first embodiment, and the light blocking structure 2 may be the light blocking structure 2 described in the first embodiment.

Figure 8:
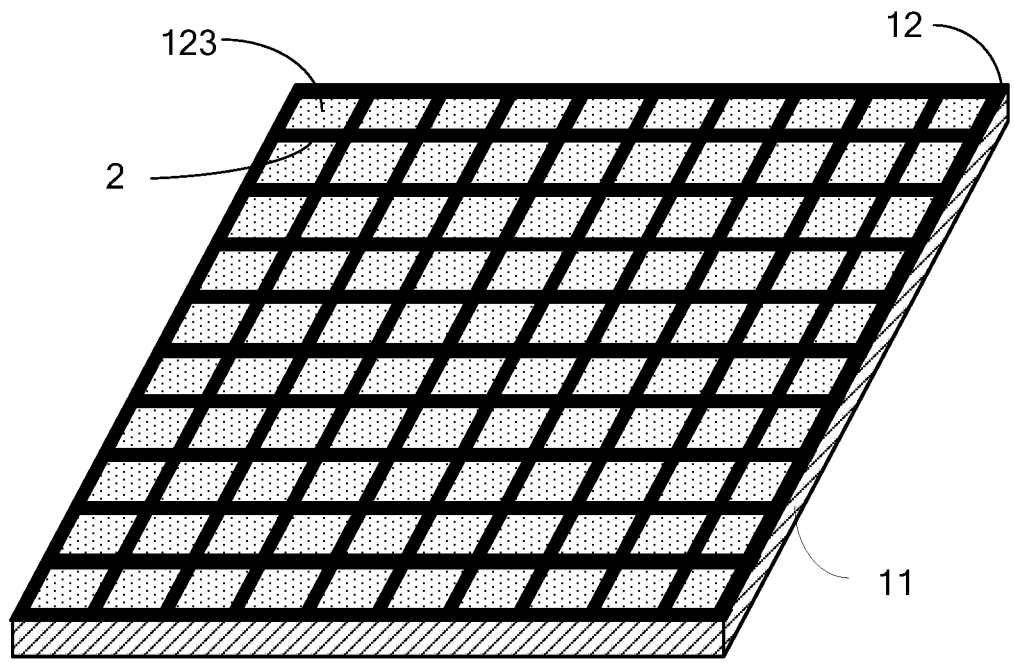
FIG. 8 is a schematic structural view of a display apparatus according to an embodiment of the present invention.

Referring to FIG. 8, embodiments of the present invention provide a display apparatus comprising a display panel 11 and a visual acuity correcting module 12.

The display panel 11 comprises M×N sub-pixels arranged in a matrix for displaying an image signal.

The visual acuity correcting module 12 is disposed in a display area of the display panel 11 and comprises a plurality of light blocking structures 2 (referring to FIGS. 1-7), the light blocking structures form M×N grid holes 123 each of which corresponds to one of the sub-pixels, and the visual acuity correcting module 12 is configured to adjust sizes of the grid holes 123. The light blocking structure 3 comprises a movable light blocking plate 21 (referring to FIGS. 1-7).

Figure 9:
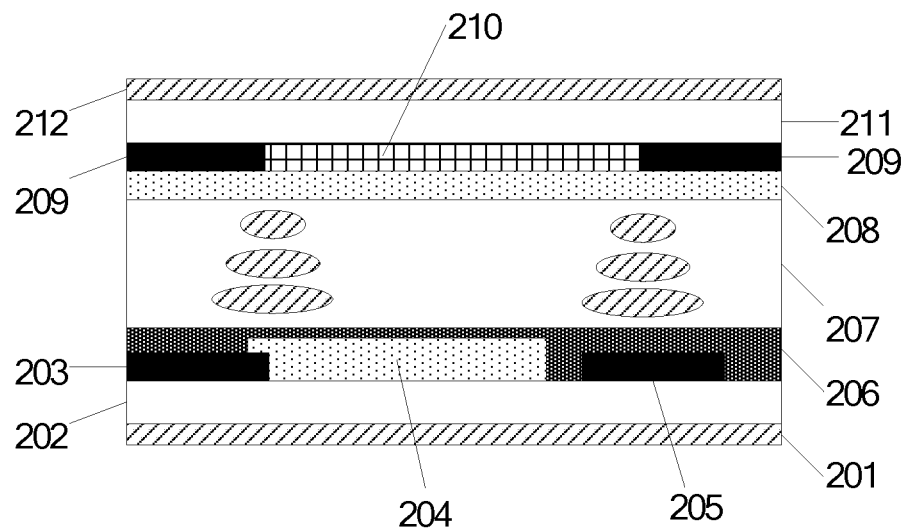
FIG. 9 is a sectional view of a display module according to an embodiment of the present invention.

Specifically, a display panel having a physical resolution of m×n comprises m rows by n columns of pixels and each pixel in turn comprises a plurality of sub-pixels. For example, one pixel may comprise three red (R), green (G) and blue (B) sub-pixels, or one pixel may comprise four red (R), green (G), blue (B), and while (W) sub-pixels. The number of the pixels included by the display panel is not limited and the number of the sub-pixels in each pixel is not limited either, in the embodiments of the present invention. In some embodiments, referring to FIG. 9 (FIG. 9 is a sectional view of the display panel 11), the display panel 11 may comprise a lower polarization filter 201, a lower substrate 202, a thin film transistor (TFT) 203, a pixel electrode 204, a storage capacitor 205, a passivation layer 206, a liquid crystal layer 207, a common electrode 208, a black matrix 209, a color filter 210, an upper substrate 211, and an upper polarization filter 212. It is to be noted that, the above display panel is one of the implementations of the display panel according to the embodiment of the present invention only, and a specific structure of the display panel is not limited in the embodiments of the present invention so long as the display panel can display the image signal.

In some embodiments, the visual acuity correcting module 12 is disposed in the display area of the display panel 11. The visual acuity correcting module 12 may be disposed over the upper polarization filter 212 of the display panel shown in FIG. 9. In addition, the visual acuity correcting module has a precision configuration. For example, a protective layer may be disposed to protect the visual acuity correcting module to avoid it from being damaged by an external force. Therefore, in some embodiments, the visual acuity correcting module is disposed between the color filter 210 and the upper substrate 211. The single substrate is used to protect both the visual acuity correcting module and the display panel, thereby reducing a thickness of the display apparatus and a production cost. The visual acuity correcting module 12 comprises a plurality of light blocking structures 2, and the light blocking structures 2 form M×N grid holes 123 in one-to-one correspondence with the sub-pixels. Thus, at least one light blocking plate 21 is disposed on at least one side of each sub-pixel (referring to FIGS. 1-7). In some embodiments, the visual acuity correcting module 12 may be formed by means of a microelectromechanical system (MEMS) technology. The MEMS technology is a technology of designing, processing, manufacturing, measuring, and controlling materials in a micron/nanon order.

The display apparatus according to the embodiments of the present invention comprises the display panel and the visual acuity correcting module, the display panel is configured to display the image signal, and the visual acuity correcting module comprises the plurality of light blocking structures, and the light blocking structures form the M×N grid holes in one-to-one correspondence with the sub-pixels, and the visual acuity correcting module can adjust the sizes of the grid holes. Thus, the display apparatus according to the embodiments of the present invention can adjust a display area of each of the sub-pixels of the display panel by adjusting the sizes of the grid holes, thereby adjusting the display luminance of the display apparatus so that the display luminance of the display apparatus is suitable for a current user. As a result, the display apparatus according to the embodiments of the present invention can protect the visual acuity of the user.

Figure 10:
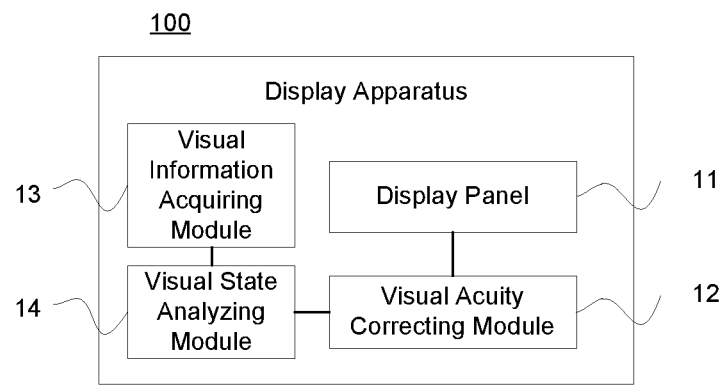
FIG. 10 is a schematic structural view of another display apparatus according to an embodiment of the present invention.

Referring to FIG. 10, a further embodiment of the present invention provides a display apparatus 100. Specifically, the display apparatus comprises:

a display panel 11, a visual acuity correcting module 12, a visual information acquiring module 13 and a visual state analyzing module 14.

The visual information acquiring module 13 is configured to acquire a frequency of wink of a user. In some embodiments, the visual information acquiring module may be an image acquiring device such as a video camera, a charge coupled device (CCD) camera, and the like.

The visual state analyzing module 14 is configured to analyze and acquire a visual fatigue state of the user according to the frequency of wink of the user.

The visual acuity correcting module 12 is configured to adjust the sizes of the grid holes according to the visual fatigue state of the user.

In some embodiments, the analyzing and acquiring the visual fatigue state of the user according to the frequency of wink of the user may comprise: storing a standard frequency of wink in the visual state analyzing module and subtracting the standard frequency of wink from the acquired frequency of wink of the user, and then analyzing and acquiring the visual fatigue state of the user according to a difference between the frequency of wink of the user and the standard frequency of wink. For example, when the difference between the frequency of wink of the user and the standard frequency of wink is greater than a threshold value, it is judged that a visual acuity of the current user is in a fatigue state, and thus the sizes of the grid holes are adjusted to suitable sizes. Of course, the fatigue state in which the visual acuity of the current user is may be further divided into a plurality of levels according to a quantity of the difference between the frequency of wink of the user and the standard frequency of wink, and the different levels correspond to different sizes of the grid holes.

In some embodiments, the visual information acquiring module and the visual state analyzing module may be disposed in a non-display area of the display apparatus. For example, the visual information acquiring module and the visual state analyzing module are disposed on a frame of the display apparatus. By disposing the visual information acquiring module 13 and the visual state analyzing module 14 in the non-display area of the display apparatus, an influence of the visual information acquiring module 13 and the visual state analyzing module 14 on a normal displaying of the display apparatus can be avoided.

In the embodiment, the visual information acquiring module can acquire the frequency of wink of the user, the visual state analyzing module can acquire the visual fatigue state of the user through the frequency of wink of the user, and the visual acuity correcting module can adjust the sizes of the grid holes according to the visual fatigue state of the user. Therefore, in the embodiment, the visual fatigue state of the user can be monitored in real time, and the sizes of the grid holes are adjusted in time, thereby enabling the display apparatus to protect the visual acuity of the user in a much more automatic and intellectual manner.

Figure 11:
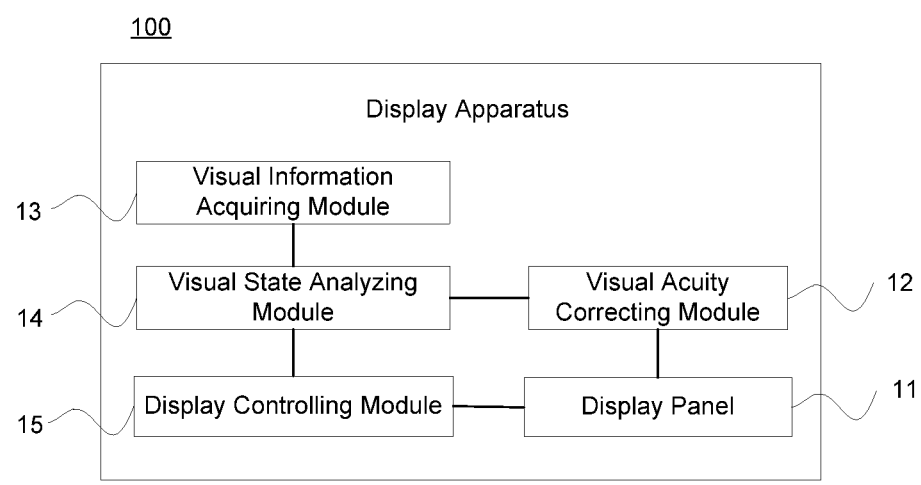
FIG. 11 is a schematic structural view of yet another display apparatus according to an embodiment of the present invention.

In some embodiments, referring to FIG. 11, the display apparatus 100 further comprises a display controlling module 15, and the visual information acquiring module 13 is further configured to acquire a distance from the user to the display apparatus. In some embodiments, when the visual information acquiring module is configured to acquire the frequency of wink of the user and the distance from the user to the display apparatus, the visual information acquiring module may comprise an image acquiring device and a distance sensor. Specifically, the image acquiring device may be a video camera, a CCD camera, and the like, while the distance sensor may be an ultrasonic distance sensor, an infrared distance sensor, and the like.

The visual state analyzing module 14 is further configured to analyze and acquire a visual dioptric state of the user according to the distance from the user to the display apparatus. Specifically, the analyzing and acquiring, by the visual state analyzing module, the visual dioptric state of the user according to the distance from the user to the display apparatus may comprise: storing a functional relation or a table of correspondence between the distance from the user to the display apparatus and the visual dioptric state in the visual state analyzing module; and obtaining the visual dioptric state corresponding to the distance by calculating by substituting the distance in a function, or obtaining the visual dioptric state of the user by looking up the table of correspondence according to the distance from the user to the display apparatus, when the visual information acquiring module acquires the distance from the user to the display apparatus.

The display controlling module 15 is configured to adjust a scaling of an image displayed on the display panel according to the visual dioptric state of the user. In some embodiments, a table of correspondence between different visual dioptric states and image scaling may be stored in the display controlling module. After acquiring the visual dioptric state of the user, a scaling of an image displayed on the display panel which is suitable for the visual dioptric state of the current user is obtained by looking up the table of correspondence.

The display apparatus according to the embodiment can acquire the visual dioptric state of the user, and can adjust performance parameters of the display panel according to the visual dioptric state of the user. Therefore, the display apparatus enables a myopic user to see an image displayed on a display with the naked eye. Furthermore, by adjusting the performance parameters of the display panel according to the visual state of the user, the display apparatus can be caused to be more suitable for the visual dioptric state of the user, thereby avoiding a visual fatigue caused by using the display apparatus for a long time, so as to be beneficial to a visual acuity health of the user.

It is to be noted that, when the display panel displays an image, generally, the image will be presented on the entire display panel. Therefore, when the image is enlarged on the display panel, only a part of the displayed image is enlarged or some elements (for example, literals) in the image are enlarged. Furthermore, because of the size of the display panel, the image cannot be infinitely enlarged. Thus, the embodiment of the present invention is not suitable for a highly myopic user.

Figure 12:
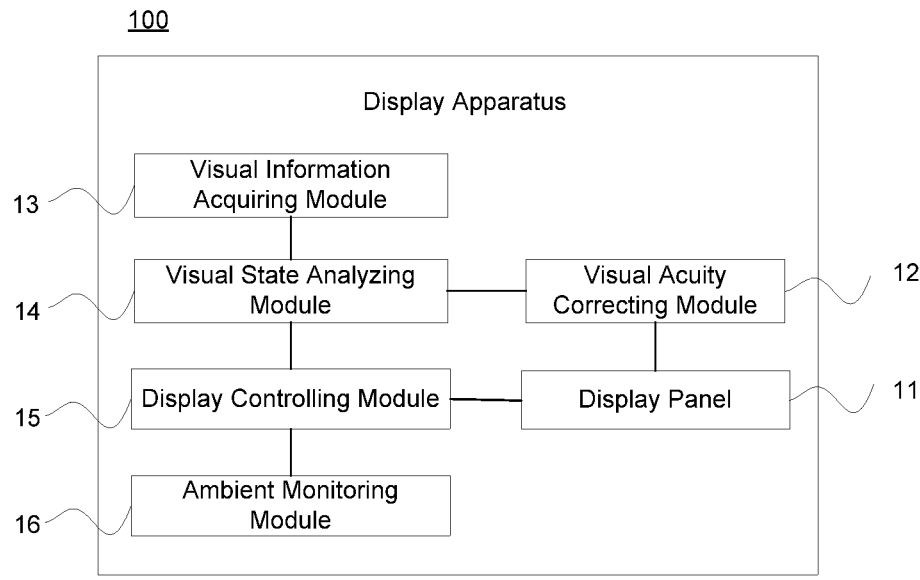
FIG. 12 is a schematic structural view of still another display apparatus according to an embodiment of the present invention.

In some embodiments, referring to FIG. 12, the display apparatus 100 further comprises an ambient monitoring module 16, the ambient monitoring module 16 is configured to detect an ambient light intensity, and the display controlling module 15 is further configured to adjust a luminance of the display panel 11 according to the ambient light intensity.

Specifically, when the ambient light is relatively weak (for example in the night), if the display luminance of a display module is too high, not only energy source of the display apparatus will be wasted, the visual acuity health of the user will also be affected. When the ambient light is relative strong (in the sunlight), if the display luminance of the display module is too low, a contrast of an image signal is decreased, affecting a display effect of the display module. Therefore, it has a significance to adapt the display luminance of the display panel to the current ambient light intensity. The display luminance of the display panel is adapted to the current ambient light intensity by monitoring the ambient light intensity in real time and adjusting the display luminance of the display panel according to the ambient light intensity.

In some embodiments, the display apparatus further comprises a storage module, and the storage module is configured to store the visual fatigue state and the visual dioptric state of the user.

Specifically, the storage module may be a real storage device such as a disk, an optical disc and the like, or a virtual storage device such as a network disk, a cloud disk, and the like. By storing the visual fatigue state and the visual dioptric state of the user, a visual acuity health condition of the user can be analyzed according to the visual acuity state of the user.

In addition, the display apparatus in any of the embodiments may comprise any products or parts having display function, such as an electronic paper, a mobile phone, a tablet computer, a TV, a display, a notebook computer, a digital frame, and navigator.

Figure 13:
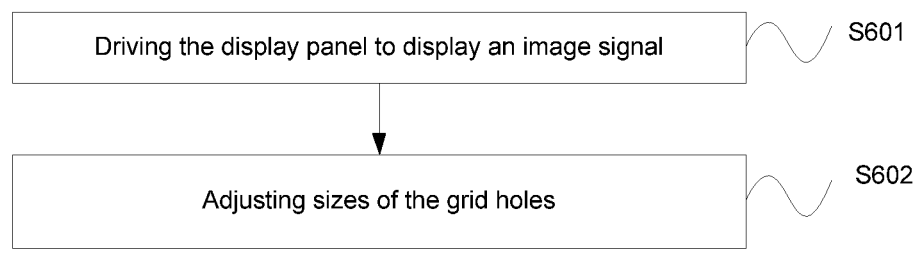
FIG. 13 is a flow diagram of steps of a method of driving a display apparatus according to an embodiment of the present invention.

An embodiment of the present invention provides a method of driving a display apparatus. The method may be used for driving the display apparatus in any of the embodiments. Specifically, the display apparatus comprises a display panel and a visual acuity correcting module, the display panel comprises M×N sub-pixels arranged in a matrix for displaying an image signal, and the visual acuity correcting module is disposed in a display area of the display panel and comprises a plurality of light blocking structures, the light blocking structures form M×N grid holes in one-to-one correspondence with the sub-pixels, and the visual acuity correcting module is configured to adjust sizes of the grid holes. Referring to FIG. 13, the method comprises:

a step S601 of driving the display panel to display an image signal; and a step S602 of adjusting the sizes of the grid holes.

With the method of driving a display apparatus according to the embodiment of the present invention, firstly the display panel is driven to display an image signal, and then the sizes of the grid holes are adjusted. Thus, the method of driving a display apparatus according to the embodiments of the present invention can adjust a display area of each of the sub-pixels of the display panel by adjusting the sizes of the grid holes, thereby adjusting the display luminance of the display apparatus so that the display luminance of the display apparatus is suitable for a current user. As a result, the method of driving a display apparatus according to the embodiments of the present invention can protect the visual acuity of the user.

In accordance with embodiments of the present invention, the method further comprises:

acquiring a frequency of wink of a user; and analyzing and acquiring a visual fatigue state of the user according to the frequency of wink of the user; and the adjusting the sizes of the grid holes comprises:
adjusting the sizes of the grid holes according to the visual fatigue state of the user.

In accordance with embodiments of the present invention, the method further comprises:
acquiring a distance from the user to the display apparatus;
analyzing and acquiring a visual dioptric state of the user according to the distance from the user to the display apparatus; and
adjusting a scaling of an image displayed on the display panel according to the visual dioptric state of the user.

In accordance with embodiments of the present invention, the method further comprises:
acquiring an ambient light intensity; and
adjusting a display luminance of the display panel according to the ambient light intensity.

In accordance with embodiments of the present invention, the method further comprises: storing the visual fatigue state and the visual dioptric state of the user.

Those skilled in the art will recognize that all or some of the steps achieving the above method according to the embodiment of the present invention can be performed by instructing a hardware relevant to a program. The program can be stored in a computer-readable storage medium comprising various mediums that can store program codes such as a ROM, a RAM, a disk or an optical disc. When the program is executed, the steps of the above method according to the embodiment of the present invention are performed.

The embodiments of the present invention provide a display apparatus and a method of driving the display apparatus, thereby enabling a display to have a visual acuity protecting function to protect a visual acuity of a user.

The embodiments of the present invention provide the abovementioned display substrate assembly. Since the sub-pixels in each of the pixels correspond to backlights of different colors, respectively and the light transmittance of each of the sub-pixels can be adjusted with the light blocking structure, an amount of each of lights of different colors transmitted by each pixel can be adjusted, so as to enable each pixel to display a different color. As a result, the display apparatus can achieve a color displaying without using a color filter substrate, so that a power consumption of the display apparatus can be reduced.

The embodiments of the present invention provide a method of driving the display substrate assembly. The method comprises controlling each of the light blocking structures to adjust the light transmittance of each of the sub-pixels. Thus, an amount of each of lights of different colors transmitted by each pixel can be adjusted, so as to enable each pixel to display different color. As a result, the display apparatus can achieve a color displaying without using a color filter substrate, so that a power consumption of the display apparatus can be reduced.

The display apparatus according to the embodiments of the present invention comprises the display panel and the visual acuity correcting module, the display panel is configured to display an image signal, and the visual acuity correcting module comprises the plurality of light blocking structures, and the plurality of light blocking structures form the M×N grid holes in one-to-one correspondence with the sub-pixels, and the visual acuity correcting module can adjust the sizes of the grid holes. Thus, the display apparatus according to the embodiments of the present invention can adjust a display area of each of the sub-pixels of the display panel by adjusting the sizes of the grid holes, thereby adjusting the display luminance of the display apparatus so that the display luminance of the display apparatus is suitable for a current user. As a result, the display apparatus according to the embodiments of the present invention can protect the visual acuity of the user.

The above embodiments are only used to explain the present invention, and should not be construed to limit the present invention. It will be understood by those skilled in the art that various changes and modifications may be made therein without departing from the scope of the present invention. Therefore, all of the equivalent technical solutions also belong to the scope of the present invention. The scope of the present invention is defined in the appended claims.

What is claimed is:

1. A display apparatus comprising a display panel and a visual acuity correcting module, wherein:
the display panel comprises M×N sub-pixels arranged in a matrix for displaying an image signal, and
the visual acuity correcting module is disposed in a display area of the display panel and comprises a plurality of light blocking structures, the plurality of light blocking structures form M×N grid holes in one-to-one correspondence with the sub-pixels, and the visual acuity correcting module is configured to adjust sizes of the grid holes based on a visual state of a user independently of driving the display panel to display the image signal.

2. The display apparatus of claim 1, wherein:
the light blocking structure comprises a movable light blocking plate.

3. The display apparatus of claim 1, further comprising:
a visual information acquiring module and a visual state analyzing module, wherein:
the visual information acquiring module is configured to acquire a frequency of wink of the user;
the visual state analyzing module is configured to analyze and acquire a visual fatigue state of the user according to the frequency of wink of the user; and
the visual acuity correcting module is further configured to adjust the sizes of the grid holes according to the visual fatigue state of the user.

4. The display apparatus of claim 3, further comprising:
a display controlling module; and
an ambient monitoring module, wherein:
the ambient monitoring module is configured to detect an ambient light intensity; and
the display controlling module is configured to adjust a display luminance of the display panel according to the ambient light intensity.

5. The display apparatus of claim 3, further comprising:
a storage module, wherein:
the storage module is configured to store the visual fatigue state.

6. A method of driving a display apparatus, the display apparatus comprising a display panel and a visual acuity correcting module, wherein: the display panel comprises M×N sub-pixels arranged in a matrix for displaying an image signal, and the visual acuity correcting module is disposed in a display area of the display panel and comprises a plurality of light blocking structures, the plurality of light blocking structures form M×N grid holes in one-to-one correspondence with the sub-pixels, and the visual acuity correcting module is configured to adjust sizes of the grid holes based on a visual state of a user; the method comprising:
driving the display panel to display an image signal; and
adjusting the sizes of the grid holes based on the visual state of the user independently of driving the display panel to display the image signal.

7. The method of claim 6, further comprising:
acquiring an ambient light intensity; and
adjusting a display luminance of the display panel according to the ambient light intensity.

8. The method of claim 6, wherein:
the light blocking structure comprises a movable light blocking plate.

9. The method of claim 6, further comprising:
acquiring a frequency of wink of a user; and
analyzing and acquiring a visual fatigue state of the user according to the frequency of wink of the user;
wherein the adjusting the sizes of the grid holes comprises:
adjusting the sizes of the grid holes according to the visual fatigue state of the user.

10. The method of claim 9, further comprising:
storing the visual fatigue state of the user.

11. The method of claim 9, further comprising:
acquiring an ambient light intensity; and
adjusting a display luminance of the display panel according to the ambient light intensity.

* * * * *